United States Patent
Khoreva et al.

(10) Patent No.: US 12,462,526 B2
(45) Date of Patent: Nov. 4, 2025

(54) TRAINING METHOD FOR A GENERATOR FOR GENERATING REALISTIC IMAGES

(71) Applicant: Robert Bosch GmbH, Stuttgart (DE)

(72) Inventors: Anna Khoreva, Stuttgart (DE); Edgar Schoenfeld, Tuebingen (DE); Vadim Sushko, Stuttgart (DE); Dan Zhang, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 315 days.

(21) Appl. No.: 17/999,000

(22) PCT Filed: Aug. 20, 2021

(86) PCT No.: PCT/EP2021/073127
§ 371 (c)(1),
(2) Date: Nov. 16, 2022

(87) PCT Pub. No.: WO2022/043204
PCT Pub. Date: Mar. 3, 2022

(65) Prior Publication Data
US 2023/0177809 A1    Jun. 8, 2023

(30) Foreign Application Priority Data
Aug. 24, 2020   (DE) .................... 10 2020 210 710.6

(51) Int. Cl.
*G06V 10/764*   (2022.01)
*G06T 11/00*    (2006.01)
(Continued)

(52) U.S. Cl.
CPC ............ *G06V 10/764* (2022.01); *G06T 11/00* (2013.01); *G06V 10/774* (2022.01);
(Continued)

(58) Field of Classification Search
CPC ... G06T 7/11; G06T 9/00; G06T 11/00; G06T 11/001; G06T 2207/20081;
(Continued)

(56) References Cited

U.S. PATENT DOCUMENTS

| | | | |
|---|---|---|---|
| 2018/0275658 A1* | 9/2018 | Iandola | G06F 30/20 |
| 2021/0073626 A1* | 3/2021 | Brahma | G05D 1/247 |

FOREIGN PATENT DOCUMENTS

DE    102018204494 B3    8/2019

OTHER PUBLICATIONS

Liu, et al. "Regularizing discriminative capability of CGANs for semi-supervised generative learning." Proceedings of the IEEE/CVF conference on computer vision and pattern recognition. Jun. 2020. (Year: 2020).*

(Continued)

*Primary Examiner* — Katrina R Fujita
(74) *Attorney, Agent, or Firm* — NORTON ROSE FULBRIGHT US LLP

(57) ABSTRACT

A method for training a generator for images from a semantic map that assigns each pixel of the image a semantic meaning of an object to which that pixel belongs. In the method, a mixed image is generated from an image generated by the generator and a determined actual training image, in which mixed image a first genuine subset of pixels is occupied by relevant corresponding pixel values of the image generated by the generator and the remaining genuine subset of pixels is occupied by relevant corresponding pixel values of the actual training image; and the images generated by the generator, the actual training image, and at least one mixed image, which belong to the same semantic training map, are supplied to a discriminator, which is (Continued)

configured to distinguish images generated by the generator from actual images of the scenery predefined by the semantic training map.

11 Claims, 3 Drawing Sheets

(51) Int. Cl.
 *G06V 10/774* (2022.01)
 *G06V 10/776* (2022.01)
 *G06V 10/82* (2022.01)
 *G06V 20/56* (2022.01)
 *G06V 20/70* (2022.01)

(52) U.S. Cl.
 CPC ............ *G06V 10/776* (2022.01); *G06V 10/82* (2022.01); *G06V 20/56* (2022.01); *G06V 20/70* (2022.01)

(58) Field of Classification Search
 CPC ........ G06T 2207/20084; G06N 3/0475; G06V 10/764; G06V 10/774; G06V 10/776; G06V 10/82; G06V 20/56; G06V 20/70
 See application file for complete search history.

(56) References Cited

OTHER PUBLICATIONS

French et al. "Consistency regularization and cutmix for semi-supervised semantic segmentation." arXiv preprint arXiv:1906.01916 2.4 (2019): 5. (Year: 2019).*
Wang et al. "High-resolution image synthesis and semantic manipulation with conditional gans." Proceedings of the IEEE conference on computer vision and pattern recognition. 2018. (Year: 2018).*
Yang et al. "On the diversity of conditional image synthesis with semantic layouts." IEEE Transactions on Image Processing 28.6 (2019): 2898-2907. (Year: 2019).*
Yun et al. "CutMix: Regularization Strategy to Train Strong Classifiers with Localizable Features." arXiv preprint arXiv:1905.04899 (2019). (Year: 2019).*
International Search Report for PCT/EP2021/073127, Issued Dec. 10, 2021.
Liu et al., "Learning To Predict Layout-To-Image Conditional Convolutions for Semantic Image Synthesis," Cornell University Library, 2020, pp. 1-15.
Schonfeld et al., "A U-Net Based Discriminator for Generative Adversarial Networks," 2020 IEEE/CVF Conference On Computer Vision and Pattern Recognition (CVPR), IEEE, 2020, pp. 8204-8213.
Uricar et al., "Yes, We GAN: Applying Adversarial Techniques for Autonomous Driving," Cornell University Library, 2020, pp. 1-16.

* cited by examiner

TRAINING METHOD FOR A GENERATOR FOR GENERATING REALISTIC IMAGES

FIELD

The present invention relates to training a generator for realistic images, which in turn can be used for training image classifiers.

BACKGROUND INFORMATION

Around 90% of the information required by a human driver to drive a vehicle in road traffic is visual information. Therefore, to drive vehicles in an at least partially automated manner, it is essential to appropriately evaluate the content of all types of image data that have been recorded while monitoring the surroundings of the vehicle. For the driving task, it is particularly important to classify the image data in terms of which traffic-relevant objects they contain, for example other road users, road markings, obstructions, and traffic signs.

Suitable image classifiers have to be trained using training images that have been recorded in a multiplicity of traffic situations. Obtaining the training images is relatively difficult and expensive. Traffic situations that rarely occur in reality may be numerically so underrepresented in the dataset containing the training images that the image classifier cannot optimally learn how to categorize them correctly. In addition, labeling the training images or the pixels thereof with associated target categories ("ground truth") requires lots of manual work.

Consequently, synthetically generated training data generated using a generator on the basis of generative adversarial networks (GAN) are also used. German Patent Application No. DE 10 2018 204 494 B3 describes a generator of this kind for radar data.

SUMMARY

In the context of the present invention, a method for training a generator for images is provided.

The term "image" is not limited to static camera images but also includes video images, radar images, LiDAR images, and ultrasound images, for example.

The images to be generated may be realistic, particularly in relation to a predefined application, for example. In this context, "realistic" may mean in particular that the images can be used in downstream processing, for example when training an image classifier, in the same way as images recorded by physical sensors. By way of example, realistic-looking generated images may be used in particular to augment a set of actual training images for an image classifier that have been recorded by sensors and then labeled. For better readability, the images to be generated will thus be referred to below as "realistic images" or "realistic-looking generated images."

According to an example embodiment of the present invention, the generator generates the realistic images from a semantic map. This semantic map assigns each pixel of the realistic image to be generated a semantic meaning of an object to which that pixel belongs. Therefore, it is not just any random realistic image that is generated but rather an image that reflects the situation predefined in the semantic map. For example, the semantic map may denote a traffic situation containing various roadways, roadway boundaries, traffic signs, road users, and other objects.

According to an example embodiment of the present invention, for the method, actual training images and associated semantic training maps, which assign a semantic meaning to each pixel of the relevant training image, are provided. There is thus one semantic training map for each actual training image. Conversely, there is at least one actual training image for each semantic training map because a semantically identical situation may have been recorded under different lighting conditions or with different mapping parameters, for example. The semantic training maps may, for example, be obtained by manually labeling the actual training images.

Using the generator to be trained, realistic images are generated from at least one semantic training map. At least one actual training image is determined in relation to the same at least one semantic training map. A discriminator is used to train the generator, which discriminator is configured to distinguish realistic images generated by the generator from actual images of the scenery predefined by the semantic training map.

A mixed image is generated from at least one realistic image generated by the generator and at least one actual training image determined in relation to the same semantic training map. In this mixed image, a first genuine subset of pixels is occupied by relevant corresponding pixel values of the realistic image generated by the generator. The remaining genuine subset of pixels is occupied by relevant corresponding pixel values of the actual training image. Each pixel of the mixed image is thus occupied by either the corresponding pixel value of the realistic image generated by the generator or the corresponding pixel value of the actual training image.

In this case, for example, contiguous regions of pixels of the mixed image to which the same meaning is assigned by the semantic training map can in particular be occupied either uniformly by corresponding pixel values of the realistic image generated by the generator or uniformly by corresponding pixel values of the actual training image. By way of example, in that case the mixed image may thus be a collage of depictions of objects in the realistic image generated by the generator and depictions of objects in the actual training image.

According to an example embodiment of the present invention, the realistic images generated by the generator, the at least one actual training image, and the at least one mixed image are supplied to the discriminator. Generator parameters characterizing the behavior of the generator are optimized so that the discriminator misclassifies the realistic images generated by the generator as actual images.

At the same time, or in an alternating manner, discriminator parameters characterizing the behavior of the discriminator are optimized so that the accuracy of the distinction between realistic-looking generated images and actual images is improved. The discriminator is thus trained to classify a realistic-looking generated image as a realistic-looking generated image and to classify an actual training image as an actual training image.

The role to be played by the mixed images in the training, i.e., which category the discriminator should output in response to a mixed image, is an adjustable degree of freedom for the training. There are many well-founded options in this respect.

For example, it may be desirable for a mixed image that predominantly includes pixels and/or objects taken from the realistic-looking generated image to be classified by the discriminator as a realistic-looking generated image. Likewise, it may be desirable, for example, for a mixed image that predominantly includes pixels and/or objects taken from the actual training image to be classified by the discriminator as an actual image. Any number of gradations in between are also possible. The discriminator parameters may thus be optimized so that the discriminator outputs the relevant desired target assignment in response to the mixed image.

Any number of gradations are also possible here. By way of example, the discriminator parameters may additionally be optimized so that the mixed image is classified as an actual image to an extent that corresponds to the numerical proportion of the pixels and/or objects carried over into the mixed image from an actual training image. Thus, if, for example, 60% of the image content of a mixed image has been carried over from an actual training image and 40% of the image content of this mixed image has been carried over from a realistic-looking generated image, it may be desirable for the discriminator to classify the mixed image as an actual image with a score of 0.6 and as a realistic-looking generated image with a score of 0.4.

It has been found that adding mixed images to the discriminator training has a twofold effect. First, this can regularize the training so that the discriminator more effectively learns the content-related and structural differences between realistic-looking generated images and actual images. Second, an available set of training images can, as it were, be multiplied by generating a multiplicity of mixed images. Even when just one actual training image is combined with one realistic-looking generated image, there are many different selection options for assembling the mixed image as a collage of objects from both images.

In particular, a PatchGAN discriminator may be selected as the discriminator, for example. This kind of discriminator distinguishes whether the image is a realistic-looking generated image or an actual image on the basis of portions of the images having a predefined size ("patches"). The results obtained in each case are then merged to form an overall result. This kind of discriminator is particularly capable of quantitatively detecting the mix ratio of actual vs. realistic-looking generated image content in the mixed image.

By way of example, the discriminator may also have an encoder-decoder assembly comprising an encoder structure and a decoder structure. The encoder structure translates an input image into an information-reduced representation in a plurality of application layers. The decoder structure further translates this information-reduced representation into an evaluation of each pixel of the input image as an actual pixel or a realistic-looking generated pixel. Therefore, the output of this kind of discriminator is not only a score evaluating the input image as a whole. Instead, the evaluation is space-resolved and can thus also detect in detail which pixels or objects of the mixed image originate from the actual image and which pixels or objects of the mixed image originate from the realistic-looking generated image.

In another advantageous embodiment of the present invention, the discriminator has at least one direct link between an application layer of the encoder structure and an application layer of the decoder structure, bypassing the information-reduced representation. In this case, a particularly relevant proportion of the information can be selectively transferred from the encoder structure into the decoder structure without having to pass through the "bottleneck" of the maximally information-reduced representation. As a result, the discriminator is given a U-Net architecture.

In another particularly advantageous embodiment of the present invention, the discriminator is additionally trained to generate, from a mixed image determined from an actual training image and a realistic-looking generated image in accordance with a predefined rule, a space-resolved output that is as close as possible to a mix of the outputs obtained for the actual training image on one hand and for the realistic-looking generated image on the other hand in accordance with the same predefined rule. In this case, the discriminator is equivariant to the mixing of the images to form the mixed image.

This can be illustrated using an example in which the scenery according to the semantic map has a vehicle in the top left corner of the image and a tree in the bottom right corner of the image. The predefined rule states that the mixed image is to combine the vehicle taken from the realistic-looking generated image with the tree taken from the actual training image. The space-resolved output determined by the discriminator for the mixed image will thus classify the region containing the vehicle as a realistic-looking generated part of the image and classify the region containing the tree as an actual image proportion.

If the discriminator is applied to the actual image, its space-resolved output should classify said actual image as an actual image in its entirety. If the discriminator is applied to the realistic-looking generated image, its space-resolved output should classify said realistic-looking generated image as a realistic-looking generated image in its entirety. If these two space-resolved outputs are then merged in the same way as the mixed image, the top left corner should be classified as an actual image proportion and the bottom right corner should be classified as a realistic-looking generated image proportion. This is the result that is also obtained when the mixed image is formed first and the space-resolved output determined thereafter.

By way of example, the cost function (loss function) of the discriminator may be expanded by a consistency term $L_c$ in the form of $$L_c = \|D(M(x,\hat{x})) - M(D(x), D(\hat{x}))\|^2$$

where D is the space-resolved output of the discriminator, and M denotes the merging operation in accordance with the predefined rule. x is the actual image, and $\hat{x}$ is the realistic-looking generated image.

To a certain extent, the motivation behind the consistency term $L_c$ is similar to the consistency test when two different people count an unsorted amount of cash in coins and/or notes. In this case, both people may set about counting the cash using different approaches. By way of example, the first person may grab the coins and/or notes in an arbitrary order and add the respective values together whereas the second person forms piles of particular numbers of coins and/or notes of the same value and then adds up the values of said piles. At the end, the amount of money should be the same in both counting methods.

By way of the regularization being described here, the discriminator is constrained to take note of the natural semantic class boundaries. The generated images are thus not only realistic at individual pixel level but also take account of the shapes that the image regions assigned to the different object types have in accordance with the semantic map.

By way of example, the space-resolved output may in particular include an output of the last layer of a neural network of the discriminator, from which layer the categorization of the input image as an actual image or a realistic-looking generated image originates, along with probabilities for both categorizations. In particular, this last layer may, for example, include "logits," i.e., classification scores not yet standardized using the Softmax function.

As explained above, a key application of the training method being described here is to augment a training dataset for an image classifier and to better train the image classifier overall starting from a predefined training dataset containing actual training images and associated target assignments to semantic meanings. Therefore, the present invention also relates to a method for training an image classifier that assigns an input image and/or pixels of this input image to a semantic meaning.

In this method, a generator is trained in accordance with the above-described method. Using this trained generator, realistic images are generated from semantic maps. These semantic maps are then no longer limited to the semantic maps that have been used to train the generator, but rather they can describe any desired scenery.

Target semantic meanings to which the trained image classifier is intended to map the realistic images are determined from the semantic maps. By way of example, the target meanings may in particular comprise an association with one or more classes of a predefined classification. If, for example, a vehicle is marked at a particular location in the semantic map, then the realistic-looking generated image will include a vehicle at that location. The image classifier is thus intended to assign the class "vehicle" at least to that image region.

A training dataset for the image classifier, which includes actual training images and associated target semantic meanings, is expanded by the realistic-looking generated images and associated target semantic meanings. The image classifier is trained using the expanded training dataset.

As explained above, in this way the training dataset can be augmented in particular with realistic images of situations that were previously underrepresented in the training dataset. The image classifier can thus be in a better position to handle these situations.

By way of example, training images of traffic situations that rarely occur but are hazardous are often difficult to obtain. Fog, extreme snowfall, or black ice, for example, may be a key component of the situation but only occur rarely. Other parts of the situation, such as two vehicles on a collision course, might be too hazardous to simulate using actual vehicles.

Therefore, the present invention also relates to a further method. In this method, an image classifier as described above is trained using realistic images generated by the trained generator. Using this trained image classifier, images that have been recorded using at least one sensor on board a vehicle are assigned to a semantic meaning. An actuation signal is determined from the semantic meaning determined by the image classifier. The vehicle is actuated using this actuation signal.

Owing to the improved training, the accuracy of the semantic meaning delivered by the image classifier is advantageously improved. The probability that the vehicle response triggered by the actuation signal is appropriate for the traffic situation shown in the images is thus advantageously increased.

In particular, the methods may be computer-implemented either in full or in part. Therefore, the present invention also relates to a computer program comprising machine-readable instructions which, when executed on one or more computers, cause the computer(s) to execute one of the above-described methods. In this respect, control devices for vehicles and embedded systems for technical devices that are also able to execute machine-readable instructions should be considered computers.

The present invention likewise relates to a machine-readable data medium and/or to a download product containing the computer program. A download product is a digital product that can be transmitted over a data network, i.e., downloaded by a user of the data network, and, for example, can be offered for sale for immediate download in an online shop.

In addition, a computer can be equipped with the computer program, with the machine-readable data medium, or with the download product.

Further measures that enhance the present invention will be set out in more detail below together with the description of the preferred exemplary embodiments of the present invention with reference to figures.

DETAILED DESCRIPTION OF EXAMPLE EMBODIMENTS

Figure 1:
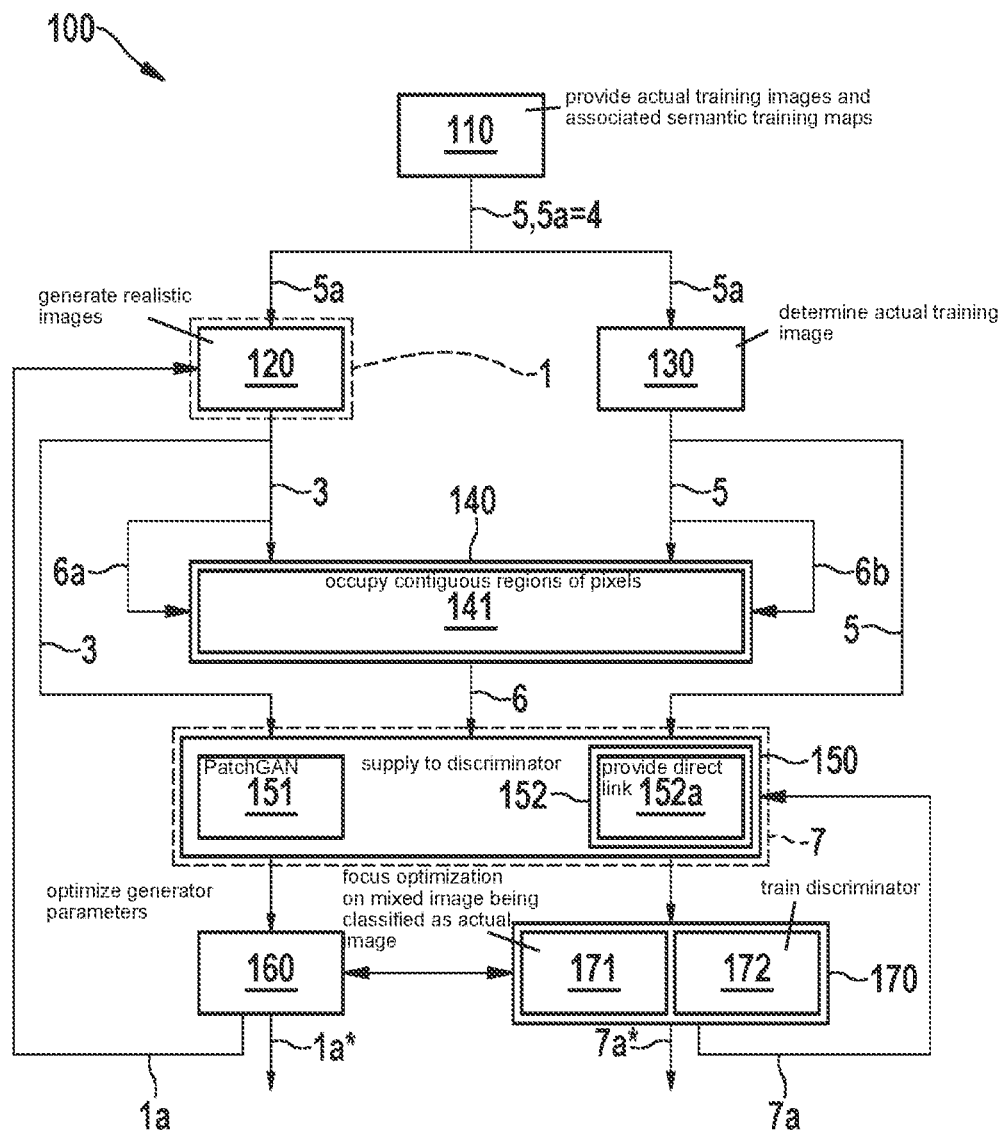
FIG. 1 shows an exemplary embodiment of the method 100 for training the generator 1, according to the present invention.

FIG. 1 is a schematic flowchart of an exemplary embodiment of the method 100. In step 110, actual training images 5 and associated semantic training maps 5a are provided. The semantic training maps 5a assign a semantic meaning 4 to each pixel of the relevant training image 5.

In step 120, realistic images 3 are generated from at least one semantic training map 5a using the generator 1 to be trained. In step 130, at least one actual training image 5 is determined in relation to the same at least one semantic training map 5a. By way of example, this may be the training image 5 whose labeling resulted in the semantic training map 5a in the first place.

In step 140, a mixed image 6 is generated from at least one realistic image 3 generated by the generator 1 and at least one actual training image 5 determined in step 130. In this mixed image 6, a first genuine subset 6a of pixels is occupied by relevant corresponding pixel values of the realistic image 3 generated by the generator 1. The remaining genuine subset 6b of pixels is occupied by relevant corresponding pixel values of the actual training image 5.

According to block 141, contiguous regions 61, 62 of pixels of the mixed image 6 to which the same semantic meaning 4 is assigned by the semantic training map 5a are occupied either uniformly by corresponding pixel values of the realistic image 3 generated by the generator 1 or uniformly by corresponding pixel values of the actual training image 5.

Figure 2:
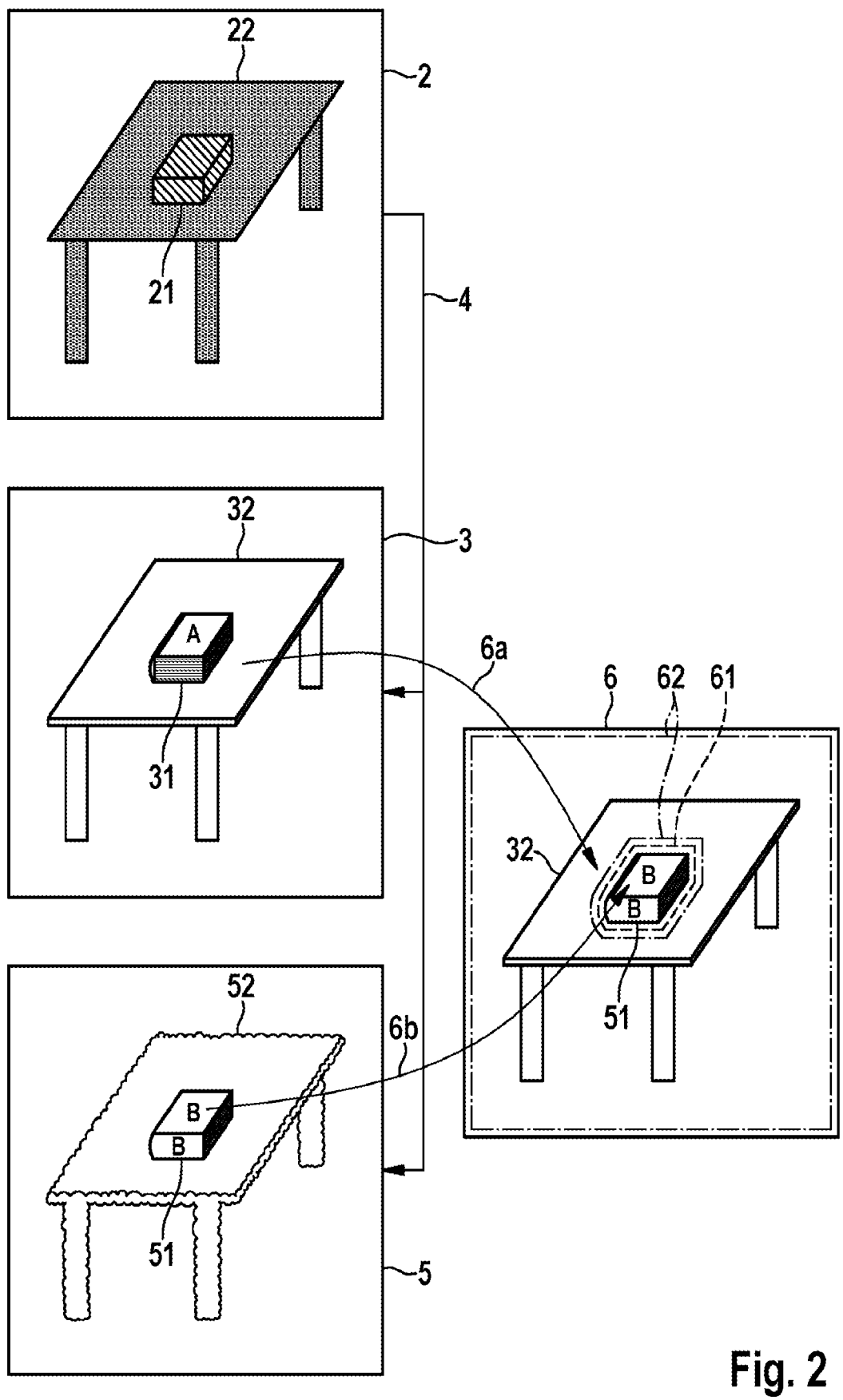
FIG. 2 illustrates the creation of a mixed image 6, according to an example embodiment of the present invention.

FIG. 2 illustrates the creation of the mixed image 6 in detail.

In step 150, the realistic images 3 generated by the generator 1, the at least one actual training image 5, and at least one mixed image 6, which all belong to the same semantic training map 5a, are supplied to a discriminator 7.

This discriminator 7 is configured to distinguish realistic images 3 generated by the generator 1 from actual images 5 of the scenery predefined by the semantic training map 5a. The discriminator 7 is only required for the training. When the fully trained generator 1 is used later, the discriminator 7 is no longer needed.

According to block 151, a PatchGAN discriminator may be selected as the discriminator 7. A PatchGAN discriminator distinguishes between realistic-looking generated images 3 and actual images 5 on the basis of portions of the images 3, 5, 6 having a predefined size and merges the results obtained in each case to form an overall result.

According to block 152, a discriminator having an encoder-decoder assembly may be selected as the discriminator 7. The encoder structure in said encoder-decoder assembly translates an input image into an information-reduced representation in a plurality of successive application layers. The decoder structure in said encoder-decoder assembly further translates this information-reduced representation into an evaluation of each pixel of the input image as an actual pixel or a realistic-looking generated pixel. According to block 152a, in particular at least one direct link between an application layer of the encoder structure and an application layer of the decoder structure, bypassing the information-reduced representation, may be provided in the discriminator 7, for example.

In step 160, generator parameters 1a characterizing the behavior of the generator 1 are optimized so that the discriminator 7 misclassifies the realistic images 3 generated by the generator 1 as actual images 5. At the same time, or in an alternating manner, in step 170 discriminator parameters 7a characterizing the behavior of the discriminator 7 are optimized so that the accuracy of the distinction between realistic-looking generated images 3 and actual images 5 is improved.

In the process, the optimization of the discriminator parameters 7a according to block 171 may additionally be focused on the mixed image 6 being classified as an actual image 5 to an extent (for instance using a score) that corresponds to the numerical proportion of the pixels and/or objects carried over into the mixed image 6 from an actual training image 5.

According to block 172, the discriminator 7 may additionally be trained to generate, from a mixed image 6 determined from an actual training image 5 and a realistic-looking generated image 3 in accordance with a predefined rule, a space-resolved output that is as close as possible to a mix of the outputs obtained for the actual training image 5 on one hand and for the realistic-looking generated image 3 on the other hand in accordance with the same predefined rule.

The fully trained state of the generator parameters 1a is denoted by reference sign 1a*. The fully trained state of the discriminator parameters 7a is denoted by reference sign 7a*.

FIG. 2 illustrates a simple example of how a mixed image 6 can be created. In this example, a semantic map 2 is predefined. This semantic map 2 assigns a first region 21 the semantic meaning 4 that the images 3, 5 used should show a book therein. The semantic map 2 assigns a second region 22 the semantic meaning 4 that the images 3, 5 used should show a table therein.

A realistic image 3 generated by the generator 1 shows a table 32 on which there is a book 31, in accordance with the semantic map 2. An actual training image 5 shows a different table 52 on which there is a different book 51.

In the mixed image 6, pixels 6a that form a contiguous region 61 are occupied by the corresponding pixel values of the realistic image 3 generated by the generator 1, which are based on the table 32. Pixels 6b that form a contiguous region 62 are occupied by the corresponding pixel values of the actual training image 5, which are based on the book 51. The mixed image 6 is thus a collage of the table 32 in the realistic image 3 generated by the generator 1 and the book 51 in the actual training image 5.

Figure 3:
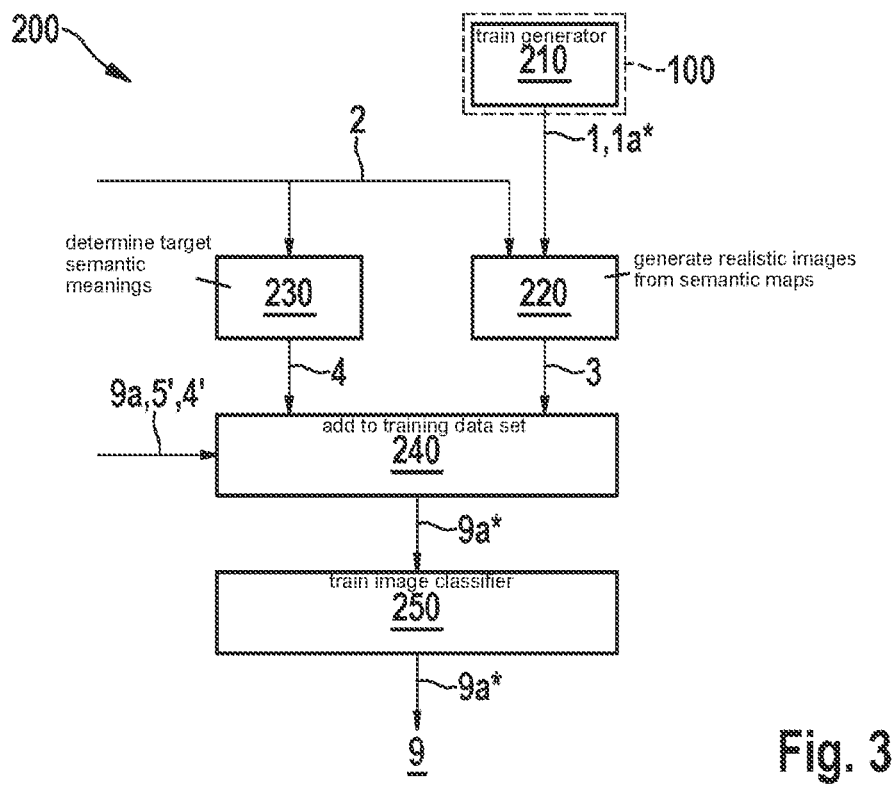
FIG. 3 shows an exemplary embodiment of the method 200 for training the image classifier 9, according to the present invention.

FIG. 3 is a schematic flowchart of an exemplary embodiment of the method 200 for training an image classifier 9. In step 210, a generator 1 is trained used the above-described method 100. In step 220, realistic images 3 are generated from semantic maps 2 using the trained generator 1. In step 230, target semantic meanings to which the image classifier 9 is intended to map the realistic images 3, or pixels thereof, are determined from the semantic maps 2 used in each case.

In step 240, the realistic images 3 generated by the generator 1 and the associated target meanings 4 are added to a training dataset 9a, which already includes actual training images 5' and associated target meanings 4'. The training dataset 9a* expanded in this way is used in step 250 to train the image classifier 9.

Figure 4:
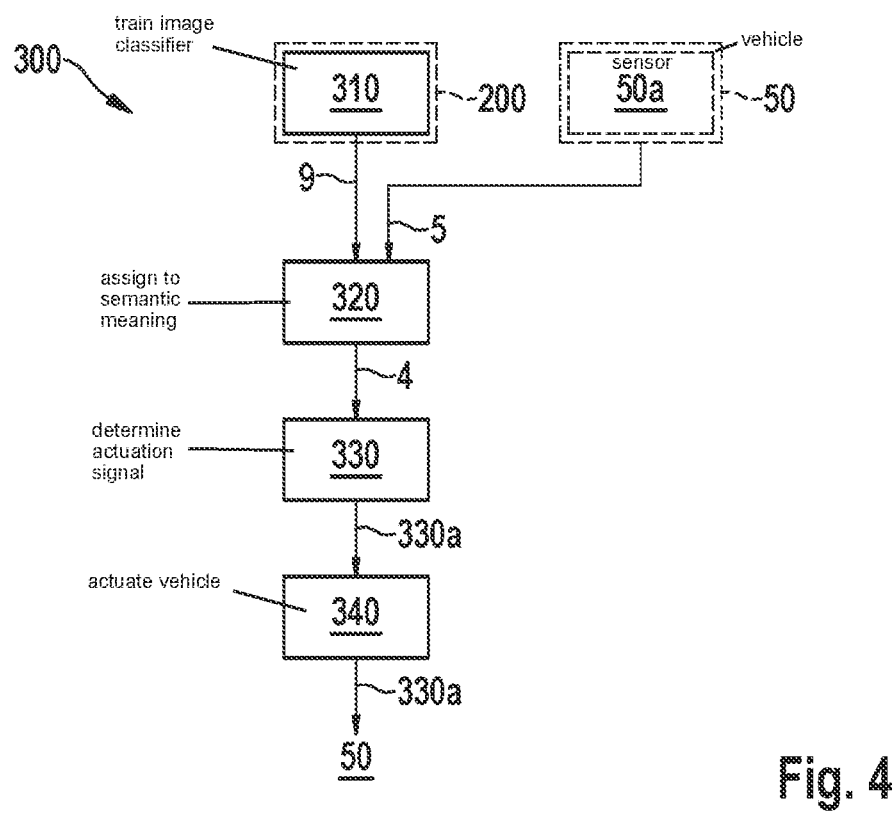
FIG. 4 shows an exemplary embodiment of the method 300 together with the entire active chain up to actuation of a vehicle 50, according to an example embodiment of the present invention.

FIG. 4 is a schematic flowchart of an exemplary embodiment of the method 300. In step 310, an image classifier 9 is trained using the above-described method 200. In step 320, using said image classifier 9, images 5 that have been recorded using at least one sensor 50a on board a vehicle 50 are assigned to a semantic meaning 4. In step 330, an actuation signal 330a is determined from said semantic meaning 4 determined by the image classifier 9. In step 340, the vehicle 50 is actuated using this actuation signal 330a.

What is claimed is:

1. A method for training a generator for images from a semantic map that assigns each pixel of the image a semantic meaning of an object to which that pixel belongs, the method comprising the following steps:

providing actual training images and associated semantic training maps that assign a semantic meaning to each pixel of the associated training image;

generating images from at least one of the semantic training maps using the generator;

determining at least one actual training image in relation to the same at least one of the semantic training maps;

generating a mixed image from at least one image generated by the generator and at least one determined actual training image, wherein in the mixed image, a first genuine subset of pixels is occupied by relevant corresponding pixel values of the image generated by the generator and a remaining genuine subset of pixels is occupied by relevant corresponding pixel values of the actual training image;

supplying the images generated by the generator, the at least one actual training image, and at least one mixed image, which belong to the same semantic training map, to a discriminator, which is configured to distinguish images generated by the generator from actual images of scenery predefined by the semantic training map;

optimizing generator parameters characterizing a behavior of the generator so that the discriminator misclassifies the images generated by the generator as actual images; and optimizing discriminator parameters characterizing a behavior of the discriminator so that an accuracy of a distinction between generated images and actual images is improved, wherein contiguous regions of pixels of the mixed image to which the same semantic meaning is assigned by the semantic training map are occupied either uniformly by corresponding pixel values of the image generated by the generator or uniformly by corresponding pixel values of the actual training image.

2. The method as recited in claim 1, wherein the discriminator parameters are additionally optimized so that the mixed image is classified as an actual image to an extent that corresponds to a numerical proportion of the pixels and/or objects carried over into the mixed image from an actual training image.

3. The method as recited in claim 1, wherein a PatchGAN discriminator, which distinguishes between generated images and actual images based on portions of the images having a predefined size and merges results obtained in each case to form an overall result, is selected as the discriminator.

4. The method as recited in claim 1, wherein a discriminator that has an encoder structure, which translates an input image into an information-reduced representation in a plurality of successive application layers, and a decoder structure, which further translates the information-reduced representation into an evaluation of each pixel of the input image as an actual pixel or a generated pixel, is selected as the discriminator.

5. The method as recited in claim 4, wherein a discriminator that has at least one direct link between an application layer of the encoder structure and an application layer of the decoder structure, bypassing the information-reduced representation, is selected as the discriminator.

6. The method as recited in claim 1, wherein the discriminator is additionally trained to generate, from a mixed image determined from an actual training image and a generated image in accordance with a predefined rule, a space-resolved output that is as close as possible to a mix of outputs obtained for the actual training image on one hand and for the generated image on the other hand in accordance with the same predefined rule.

7. The method as recited in claim 6, wherein the space-resolved output includes an output of a last layer of a neural network of the discriminator, from which layer the categorization of the input image as an actual image or a generated image originates, along with probabilities for both categorizations.

8. A method for training an image classifier that assigns an input image and/or pixels of the input image to a semantic meaning, the method comprising the following steps:
   training a generator by:
      providing actual training images and associated semantic training maps that assign a semantic meaning to each pixel of the associated training image,
      generating images from at least one of the semantic training maps using the generator,
      determining at least one actual training image in relation to the same at least one of the semantic training map,
      generating a mixed image from at least one image generated by the generator and at least one determined actual training image, wherein in the mixed image, a first genuine subset of pixels is occupied by relevant corresponding pixel values of the image generated by the generator and a remaining genuine subset of pixels is occupied by relevant corresponding pixel values of the actual training image,
      supplying the images generated by the generator, the at least one actual training image, and at least one mixed image, which belong to the same semantic training map, to a discriminator, which is configured to distinguish images generated by the generator from actual images of scenery predefined by the semantic training map,
      optimizing generator parameters characterizing a behavior of the generator so that the discriminator misclassifies the images generated by the generator as actual images, and
      optimizing discriminator parameters characterizing a behavior of the discriminator so that an accuracy of a distinction between generated images and actual images is improved;
   generating images from semantic maps using the trained generator;
   determining, from each of the semantic maps, target semantic meanings to which the trained image classifier is intended to map each image;
   expanding a training dataset for the image classifier, which includes actual training images and associated target semantic meanings, by the generated images and associated target semantic meanings; and
   training the image classifier using the expanded training dataset, wherein contiguous regions of pixels of the mixed image to which the same semantic meaning is assigned by the semantic training map are occupied either uniformly by corresponding pixel values of the image generated by the generator or uniformly by corresponding pixel values of the actual training image.

9. A method, comprising the following step:
   training an image classifier by:
      training a generator by:
         providing actual training images and associated semantic training maps that assign a semantic meaning to each pixel of the associated training image,
         generating images from at least one of the semantic training maps using the generator,
         determining at least one actual training image in relation to the same at least one of the semantic training maps,
         generating a mixed image from at least one image generated by the generator and at least one determined actual training image, wherein in the mixed image, a first genuine subset of pixels is occupied by relevant corresponding pixel values of the image generated by the generator and a remaining genuine subset of pixels is occupied by relevant corresponding pixel values of the actual training image,
         supplying the images generated by the generator, the at least one actual training image, and at least one mixed image, which belong to the same semantic training map, to a discriminator, which is configured to distinguish images generated by the generator from actual images of scenery predefined by the semantic training map,
         optimizing generator parameters characterizing a behavior of the generator so that the discriminator misclassifies the images generated by the generator as actual images,
         optimizing discriminator parameters characterizing a behavior of the discriminator so that an accuracy of a distinction between generated images and actual images is improved,
         generating images from semantic maps using the trained generator, determining, from each of the semantic maps, target semantic meanings to which the trained image classifier is intended to map each image, expanding a training dataset for the image classifier, which includes actual training images and associated target semantic meanings, by the generated images and associated target semantic meanings, and training the image classifier using the expanded training dataset;

assigning images that have been recorded using at least one sensor on board a vehicle to a semantic meaning using the image classifier;

determining an actuation signal from the semantic meaning determined by the image classifier;

actuating the vehicle using the actuation signal, wherein contiguous regions of pixels of the mixed image to which the same semantic meaning is assigned by the semantic training map are occupied either uniformly by corresponding pixel values of the image generated by the generator or uniformly by corresponding pixel values of the actual training image.

10. A non-transitory machine-readable data medium on which is stored a computer program for training a generator for images from a semantic map that assigns each pixel of the image a semantic meaning of an object to which that pixel belongs, the computer program, when executed by one or more computers, causing the one or more computers to perform the following steps:

providing actual training images and associated semantic training maps that assign a semantic meaning to each pixel of the associated training image;

generating images from at least one of the semantic training maps using the generator;

determining at least one actual training image in relation to the same at least one of the semantic training maps;

generating a mixed image from at least one image generated by the generator and at least one determined actual training image, wherein in the mixed image, a first genuine subset of pixels is occupied by relevant corresponding pixel values of the image generated by the generator and a remaining genuine subset of pixels is occupied by relevant corresponding pixel values of the actual training image;

supplying the images generated by the generator, the at least one actual training image, and at least one mixed image, which belong to the same semantic training map, to a discriminator, which is configured to distinguish images generated by the generator from actual images of scenery predefined by the semantic training map;

optimizing generator parameters characterizing a behavior of the generator so that the discriminator misclassifies the images generated by the generator as actual images; and optimizing discriminator parameters characterizing a behavior of the discriminator so that an accuracy of a distinction between generated images and actual images is improved, wherein contiguous regions of pixels of the mixed image to which the same semantic meaning is assigned by the semantic training map are occupied either uniformly by corresponding pixel values of the image generated by the generator or uniformly by corresponding pixel values of the actual training image.

11. A computer configured to train a generator for images from a semantic map that assigns each pixel of the image a semantic meaning of an object to which that pixel belongs, the computer configured to:

provide actual training images and associated semantic training maps that assign a semantic meaning to each pixel of the associated training image;

generate images from at least one of the semantic training maps using the generator;

determine at least one actual training image in relation to the same at least one of the semantic training maps;

generate a mixed image from at least one image generated by the generator and at least one determined actual training image, wherein in the mixed image, a first genuine subset of pixels is occupied by relevant corresponding pixel values of the image generated by the generator and a remaining genuine subset of pixels is occupied by relevant corresponding pixel values of the actual training image;

supply the images generated by the generator, the at least one actual training image, and at least one mixed image, which belong to the same semantic training map, to a discriminator, which is configured to distinguish images generated by the generator from actual images of scenery predefined by the semantic training map;

optimize generator parameters characterizing a behavior of the generator so that the discriminator misclassifies the images generated by the generator as actual images; and optimize discriminator parameters characterizing a behavior of the discriminator so that an accuracy of a distinction between generated images and actual images is improved, wherein contiguous regions of pixels of the mixed image to which the same semantic meaning is assigned by the semantic training map are occupied either uniformly by corresponding pixel values of the image generated by the generator or uniformly by corresponding pixel values of the actual training image.

* * * * *